(12) United States Patent
Wu (10) Patent No.: US 9,736,788 B2
(45) Date of Patent: Aug. 15, 2017

(54) INTERFERENCE MANAGEMENT IN THE HETEROGENEOUS NETWORK

(71) Applicant: ZTE (USA) INC., Richardson, TX (US)

(72) Inventor: Huaming Wu, San Diego, CA (US)

(73) Assignee: ZTE (USA) INC., Austin, TX (US)

( * ) Notice: Subject to any disclaimer, the term of this patent is extended or adjusted under 35 U.S.C. 154(b) by 0 days.

(21) Appl. No.: 14/379,254

(22) PCT Filed: Feb. 27, 2013

(86) PCT No.: PCT/US2013/028051
§ 371 (c)(1),
(2) Date: Aug. 15, 2014

(87) PCT Pub. No.: WO2013/138068
PCT Pub. Date: Sep. 19, 2013

(65) Prior Publication Data
US 2016/0021621 A1    Jan. 21, 2016

Related U.S. Application Data (60) Provisional application No. 61/610,385, filed on Mar. 13, 2012, provisional application No. 61/668,912, filed on Jul. 6, 2012.

(51) Int. Cl.
*H04W 52/24*     (2009.01)
*H04W 52/36*     (2009.01)
*H04W 72/12*     (2009.01)

(52) U.S. Cl.
CPC ....... *H04W 52/244* (2013.01); *H04W 52/367* (2013.01); *H04W 72/12* (2013.01)

(58) Field of Classification Search
None
See application file for complete search history.

(56) References Cited

U.S. PATENT DOCUMENTS

2013/0286849 A1* 10/2013 Park ............... H04B 7/024
                                                   370/241
2014/0036786 A1*  2/2014 Kazmi ........... H04W 52/146
                                                   370/329

(Continued)

FOREIGN PATENT DOCUMENTS

CN     102065490 A     5/2011
CN     102340344 A     2/2012

(Continued)

OTHER PUBLICATIONS

3GPP TS 36.423 V10.1.0, '3GPP; TSGRAN; Evolved Universal Terrestrial Radio, Access Network(E-UTRAN); X2 application protocol(X2AP) (Release 10)', Jun. 2011, 15 pgs.

(Continued)

*Primary Examiner* — Mohammad Adhami
(74) *Attorney, Agent, or Firm* — Morgan, Lewis & Bockius LLP (57) ABSTRACT

A method of conveying transmit power information from a first cell to a second cell is provided. The first cell prepares a data structure including a plurality of elements, each element corresponding to a respective downlink subframe in a radio frame associated with the first cell and its value corresponding a respective minimum transmit power reduction level promised by the first cell during the downlink subframe. The first cell then transmits the data structure to the second cell via a predefined interface. The second cell processes the data structure and schedules one or more user equipments in one or more downlink subframes of the radio frame in accordance with the data structure.

14 Claims, 7 Drawing Sheets

(56) References Cited

U.S. PATENT DOCUMENTS

| | | | |
|---|---|---|---|
| 2014/0086166 A1* | 3/2014 | Lindbom | H04W 52/16 370/329 |
| 2014/0086203 A1* | 3/2014 | Furuskar | H04W 52/143 370/330 |
| 2014/0198744 A1* | 7/2014 | Wang | H04B 7/0617 370/329 |
| 2014/0286219 A1* | 9/2014 | Siomina | H04J 11/0023 370/311 |
| 2014/0321410 A1* | 10/2014 | Frederiksen | H04W 72/082 370/329 |

FOREIGN PATENT DOCUMENTS

| | | |
|---|---|---|
| KR | 1020120017005 A | 2/2012 |
| WO | WO 2011/163201 A1 | 12/2011 |

OTHER PUBLICATIONS

New POSTCOM, 'Performance evaluation of FeICIC with reduced power in ABS', RI-113704, 3GPP TSG RAN WG1 Meeting #67, San Francisco, CA, Nov. 14-18, 2011, 4 pgs.

ETSI, LTE; Evolved Universal Terrestrial Radio Access Network (E-UTRAN); X2 Application Protocol (X2AP), 3GPP TS 136 423, Version 10.4.0 Release 10, Jan. 2012, 137 pgs.

NEC Group, Macro cell transmission power adjustment in ABS subframes for FeICIC in non-CA Scenario, R1-113870, 3GPP TSG-RAN WG1#67, Nov. 14-18, 2011, 4 pgs.

Panasonic, Performance Study on ABS with Reduced Macro Power, R1-113806, 3GPP TSG-RAN WG1, Meeting #67, Nov. 14-18, 2011, 9 pgs.

ZTE, On signalling for reduced power ABS, R1-120285, 3GPP TSG RAN WG1 Meeting #68, Feb. 6-10, 2012, 4 pgs.

ZTE (USA) Inc., International Search Report and Written Opinion, PCT/US2013/028051, Jun. 18, 2013, 10 pgs.

ZTE (USA) Inc., International Preliminary Report on Patentability, PCT/US2013/028051, Sep. 16, 2014, 7 pgs.

ZTE (USA) Inc., Communication Pursuant to Rule 161(2) and 162, EP13761672.8, Oct. 21, 2014, 3 pgs.

ZTE (USA) Inc., Communication Pursuant to Rule 70(2) and 70a(2), EP13761672.8, Oct. 16, 2015, 1 pg.

ZTE USA, Inc., Extended European Search Report, EP13761672.8, Sep. 30, 2015, 6 pgs.

ZTE USA, Inc., Intention to Grant, EP13761672.8, Jul. 15, 2016, 6 pgs.

3GPP TS 36.423 V10.1.0, Mar. 2011, X2 application protocol (X2AP), 3GPP, 6 pgs.

* cited by examiner

INTERFERENCE MANAGEMENT IN THE HETEROGENEOUS NETWORK

CROSS REFERENCE TO RELATED APPLICATIONS

This application is a United States National Stage Application filed under 35 U.S.C. §371 of PCT Patent Application Ser. No. PCT/US2013/028051 filed on Feb. 27, 2013, which claims the benefit of and priority to U.S. Provisional Patent Application No. 61/610,385 filed on Mar. 13, 2012, and U.S. Provisional Patent Application No. 61/668,912 filed on Jul. 6, 2012, which are hereby incorporated by reference in their entireties.

TECHNICAL HELD

The present invention generally relates to interference management in a heterogeneous network (HetNet) system, and in particular, to systems and methods of conveying transmit power information associated with different subframes between an aggressor cell and a victim cell.

BACKGROUND

Heterogeneous networks are one of many features in LTE Advanced (LTE-A). The idea is that a network should not only consist of a single type of eNodeB (eNB) like the case of a homogeneous network, but also deploy eNBs of different capabilities, e.g., of different transmit-power classes. These eNBs are referred to as macro eNBs (MeNB), pico eNBs (PeNB) and femto/home eNBs (HeNB), which are meant for basic outdoor, outdoor hotspot, and indoor/enterprise coverage, respectively. In other words, the HetNet deployment consists of deploying both high-power and low-power nodes with the low-power nodes placed throughout the layout of high-power nodes. Although HetNet offers opportunities to enable large-scale, low-cost deployment of small base stations below rooftops to improve user experience at hotspots or to improve the network coverage, it introduces new challenges to inter-cell interference coordination within the same channel as well as load balancing and user mobility in idle and active mode.

SUMMARY

In accordance with some implementations, a method of conveying transmit power information from a first cell to a second cell includes: preparing a data structure at the first cell, the data structure including a plurality of elements and each element corresponding to a respective downlink subframe in a radio frame associated with the first cell. Each element's value corresponds to a respective minimum transmit power reduction level promised by the first cell during the downlink subframe. The data structure is transmitted from the first cell to the second cell via a predefined interface. The second cell is configured to schedule one or more user equipments in one or more downlink subframes of the radio frame in accordance with the data structure.

According to some implementations, the data structure is a string including a plurality of numerical elements, a relative position of a respective numerical element in the string corresponding to a relative position of a respective downlink subframe in the radio frame. The respective numerical element has a value selected from the group consisting of 0, 1, 2, 3, 4, 5, and 6, which represent the minimum transmit power reduction levels of the first cell at 0 dB, ∞ dB, 6 dB, 9 dB, 12 dB, 15 dB, and 18 dB, respectively, from a nominal transmit power level.

According to some implementations, the minimum transmit power reduction level of 0 dB means that the first cell transmits signals at its nominal power and the second cell may not schedule any user equipment in a corresponding downlink subframe due to high interference. The minimum transmit power reduction level of ∞ dB means that the first cell will not schedule any user equipment in a corresponding downlink subframe. The minimum transmit power reduction level of 6 dB, 9 dB, 12 dB, 15 dB, and 18 dB means that the first cell schedules any user equipment in a corresponding downlink subframe below a corresponding transmit power level, which is reduced by an amount defined by the minimum transmit power reduction level from a nominal transmit power level.

According to some implementations, the first cell is an aggressor cell and the second cell is a victim cell. The first cell is configured to transmit the data structure to the second cell in a message through an X2 interface between the two cells defined by the 3GPP standard. For example, the first cell is a macro eNB and the second cell is one selected from the group consisting of a remote radio head, a pica eNB, and a femto eNB.

In accordance with some implementations, a method of conveying transmit power information from a first cell to a second cell comprises: preparing a first data structure at the first cell, the first data structure including a plurality of elements and each element corresponding to a respective downlink subframe in a radio frame associated with the first cell. Each element's value indicates whether the second cell can schedule any user equipment during a corresponding downlink subframe. The first cell also prepares a second data structure, the second data structure including a plurality of elements and each element corresponding to a respective downlink subframe during which the second cell can schedule user equipments. Each element's value indicates a respective minimum transmit power reduction level promised by the first cell during the corresponding downlink subframe. Both the first data structure and the second data structure are transmitted from the first cell to the second cell via a predefined interface. The second cell is configured to schedule one or more user equipments in one or more downlink subframes of the radio frame in accordance with the first data structure and the second data structure.

According to some implementations, the first data structure is an almost blank subframe (ABS) pattern bitmap, a binary value of 0 in the bitmap indicating that the second cell may not schedule any user equipment during a corresponding downlink subframe and a binary value of 1 indicating that the second cell may schedule user equipment in accordance with the second data structure. The value of an element in the second data structure is one selected from the group consisting of 0, 1, 2, 3, 4, and 5, which correspond to the first cell's minimum transmit power reduction levels of ∞ dB, 6 dB, 9 dB, 12 dB, 15 dB, and 18 dB, respectively, from a nominal transmit power level.

According to some implementations, the first cell is an aggressor cell and the second cell is a victim cell. The first cell is configured to transmit the first and second data structures to the second cell in a message through an X2 interface between the two cells defined by the 3GPP standard. The first cell is a macro eNB and the second cell is one selected from the group consisting of a remote radio head, a pico eNB, and a femto eNB.

In accordance with some implementations, a method of conveying transmit power information from a first cell to a second cell comprises: preparing a first data structure at the first cell, the first data structure including a plurality of elements and each element corresponding to a respective downlink subframe in a radio frame associated with the first cell. Each element's value indicates whether the first cell promises a transmit power reduction during the corresponding downlink subframe. The first cell also prepares a second data structure. The second data structure includes a plurality of elements, each element corresponding to a respective downlink subframe during which the first cell promises a transmit power reduction and its value indicating a respective threshold under which the first cell agrees to keep its maximum transmit power during the downlink subframe. The first data structure and the second data structure are transmitted from the first cell to the second cell via a predefined interface. The second cell is configured to schedule one or more user equipments in one or more downlink subframes of the radio frame in accordance with the first data structure and the second data structure.

According to some implementations, the first data structure is an almost blank subframe (ABS) pattern bitmap, a binary value of 0 in the bitmap indicating that the first cell does not promise any transmit power reduction during a corresponding downlink subframe and a binary value of 1 indicating that the first cell promises a predefined transmit power reduction in accordance with the second data structure. The threshold of an element in the second data structure is one selected from the group consisting of 6 dB, 7 dB, 8 dB, 9 dB, 10 dB, 11 dB, 12 dB, 13 dB, 14 dB, 15 dB, 16 dB, 17 dB, and 18 dB, and ∞ dB, respectively.

According to some implementations, the first cell is an aggressor cell and the second cell is a victim cell. The first cell is configured to transmit the first and second data structures to the second cell in one message through an X2 interface between the two cells defined by the 3GPP standard. The first cell is a macro eNB and the second cell is one selected from the group consisting of a remote radio head, a pico eNB, and a femto eNB.

According to some implementations, a method of exchanging resource status information between a first cell and a second cell comprises: the first cell transmitting a request to the second cell via a predefined interface; and in response to the request, the second cell transmitting a data structure to the first cell via a predefined interface.

According to some implementations, the first cell is an aggressor cell and the second cell is a victim cell. The second cell is configured to transmit the data structure to the first cell in a message through an X2 interface between the two cells defined by the 3GPP standard. The data structure includes a percentage of the used reduced power ABS resource, the numerator of the percentage representing the number of resource blocks allocated (i.e., actually used) by the victim cell within the usable reduced power ABS and the denominator of the percentage representing the total number of resource blocks within the usable reduced power ABS in the victim cell. The first cell is a macro eNB and the second cell is one selected from the group consisting of a remote radio head, a pica eNB, and a femto eNB.

BRIEF DESCRIPTION OF THE DRAWINGS

Different aspects of the present invention as well as features and advantages thereof will be more clearly understood hereinafter because of a detailed description of implementations of the present invention when taken in conjunction with the accompanying drawings, which are not necessarily drawn to scale. Like reference numerals refer to corresponding parts throughout the several views of the drawings.

DESCRIPTION OF EMBODIMENTS

Reference will now be made in detail to implementations, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on many types of outdoor radios systems.

Figure 1A:
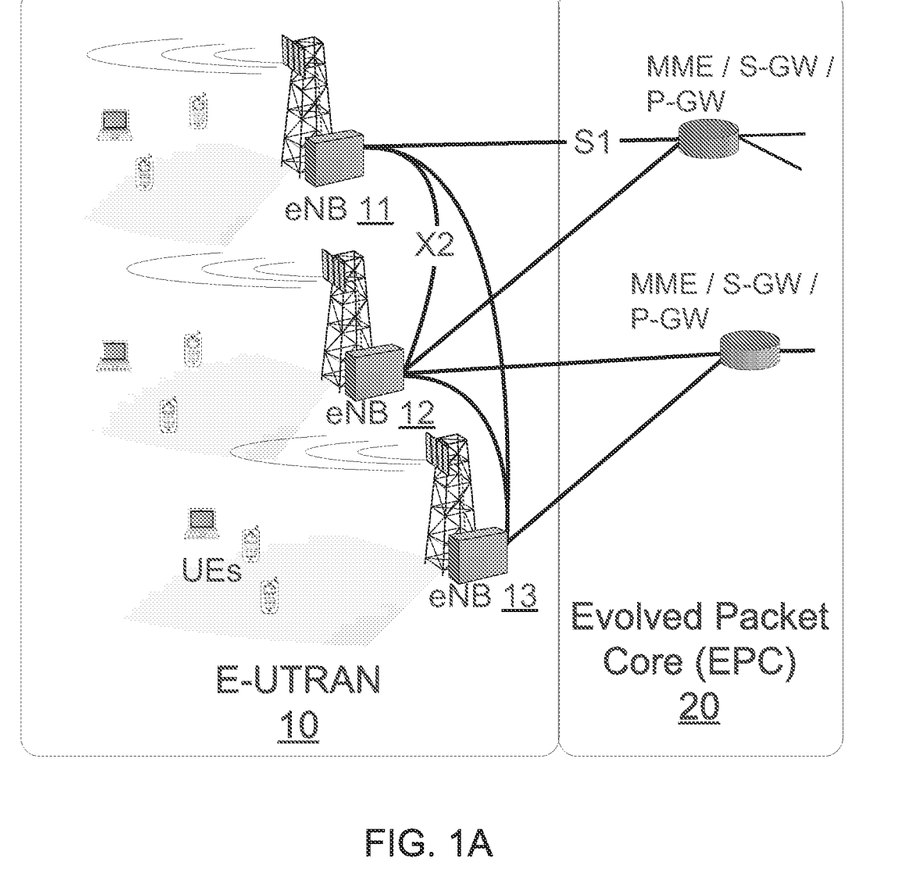
FIGS. 1A and 1B depict, respectively, the network architecture of LTE Advanced (LTE-A) and the interference between a macro eNB and a pico eNB.
Figure 1B:
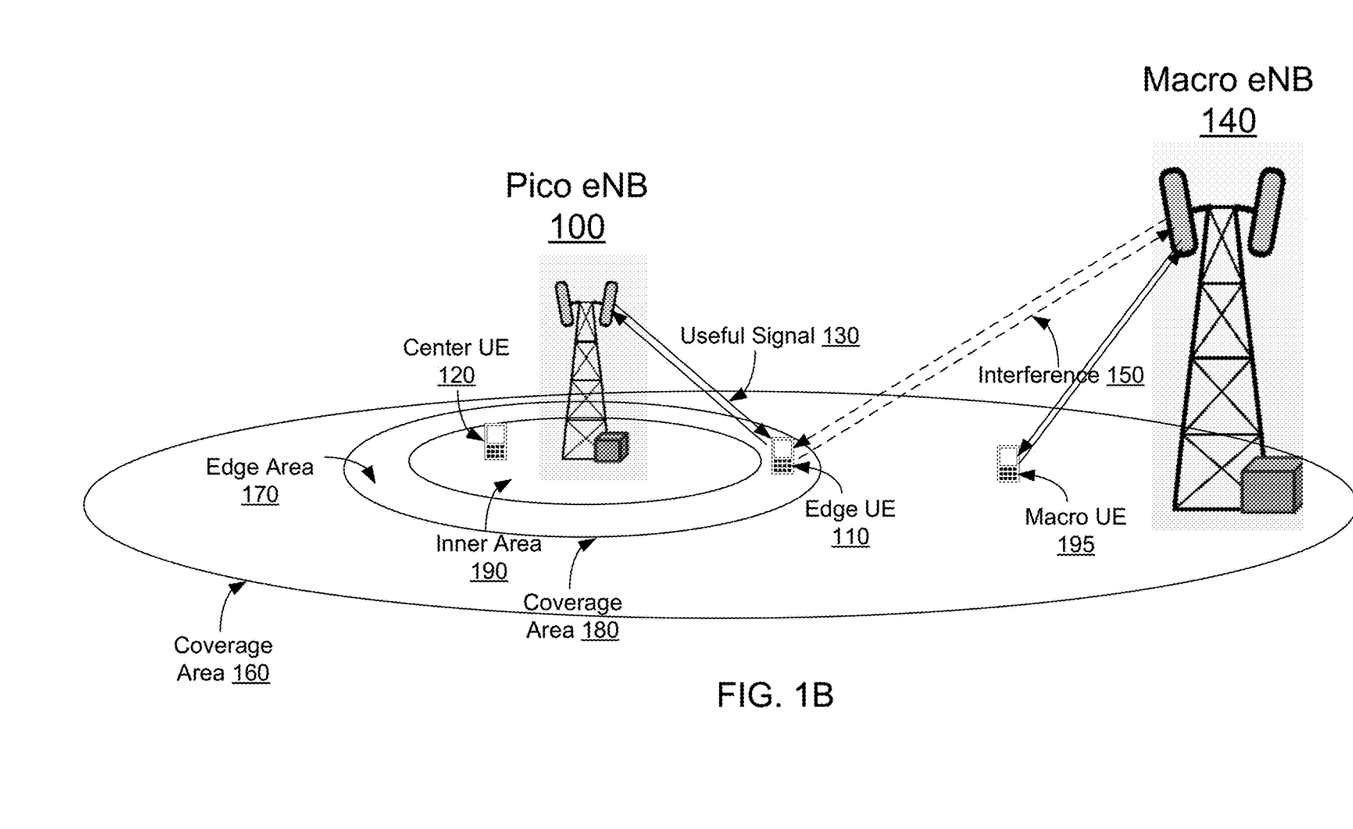

FIGS. 1A and 1B depict, respectively, the network architecture of LTE Advanced and the interference between a macro eNB and a pico eNB. FIG. 1A depicts that E-UTRAN 10, which stands for "Evolved UMTS Terrestrial Radio Access Network", is the air interface of 3GPP's Long Term Evolution Advanced (LTE-A). The E-UTRAN 10 consists of a plurality of eNBs (11, 12, 13) on the network side, each eNB having a specific coverage area and responsible for scheduling one or more User Equipments (UEs) in the coverage area. The eNBs are connected to each other via the X2 interface, and they connect to the Evolved Packet Core 20 (EPC) network via the S1 interface.

A typical high power node, which has a maximum allowable transmit power of 46 dBm for a 10 MHz carrier bandwidth, can create a relatively large coverage area. Several types of low power nodes (LPN), which have a smaller coverage area than the high power node but may improve the quality and reliability of the coverage provided by the high power node, have been introduced into the large coverage area. These low power nodes include remote radio heads, pico eNBs, home eNBs (HeNBs), and the like. The maximum allowable transmit power of a remote radio head/pico eNB or a HeNB is typically 30 dBm or 20 dBm for a 10 MHz carrier bandwidth. In the present application, terms like "high power cell," "high power node," "macro cell," and "micro eNB" are used interchangeably. As such, the coverage area of a low power node is referred to as a pico eNB (or cell), a femto eNB (or cell), a hotzone eNB (or cell), a low power eNB (or cell), or the like, any of which might be used interchangeably herein.

Besides the different transmit powers, these low power nodes have different connections to the core network (i.e., the EPC 20) and to their neighboring cells. For example, a pico cell is a small cellular base station with a dedicated backhaul connection to the service provider's core network (e.g., through S1 interface 3GPP) and other pico/macro cells (e.g., through X2 interface in 3GPP). A femto cell is also a small cellular base station designed for use at a home or small business. The femto cell connects to the service provider's network via the broadband (such as DSL or cable). The HeNB may have no direct interface to other femto cells or any macro cell.

When high power nodes and tow power nodes are deployed in the same data/control channel, there may be interference problems for high power and low power cell User Equipments (UEs). For illustrative purposes, FIG. 1B depicts one pico eNB 100 and one macro eNB 140. The macro eNB 140 has a large coverage area 160 and the pico eNB 100 has a small coverage area 180, which is inside the coverage area 160. The small coverage area 180 is divided into an inner area 190 and an edge area 170. If a UE (e.g., the center UE 120) is located within the inner area 190, the user equipment is more likely connected to the pico eNB 100 and not affected by other neighboring cells including the macro eNB 140. In contrast, a UE (e.g., the edge UE 110) located in the edge area 170 may receive both useful signal 130 from the pico eNB 100 and strong interference 150 from the macro eNB 140 such that the latter may affect the quality of the useful signal received by the edge UE 110. Alternatively, when a macro cell UE (e.g., the macro UE 195) moves close to the pico eNB 100, the signal from the pico eNB 100 may also cause interference to the signal the macro cell UE receives from the macro eNB 140. In both cases, the interference may be so strong that the affected UE cannot maintain a normal service from its serving cell. Note that in the present application, terms like "aggressor cell" and "interfering cell" are used interchangeably herein and terms like "victim cell" and "interfered cell" are also used interchangeably herein.

Figure 2A:
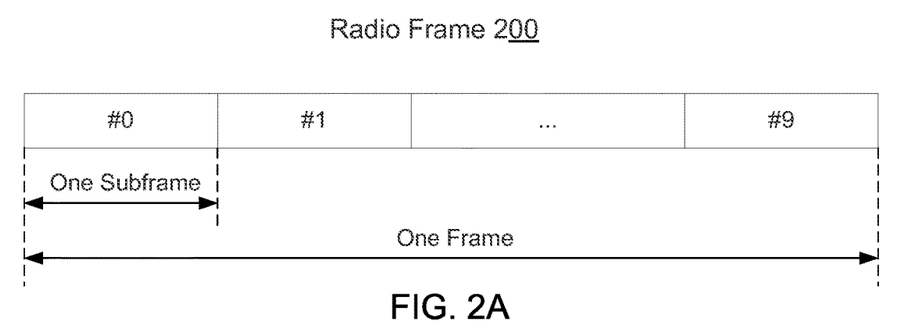
FIGS. 2A and 2B depict, respectively, the structure of a radio frame in the time domain and an almost blank subframe (ABS) pattern info bitmap.
Figure 2B:
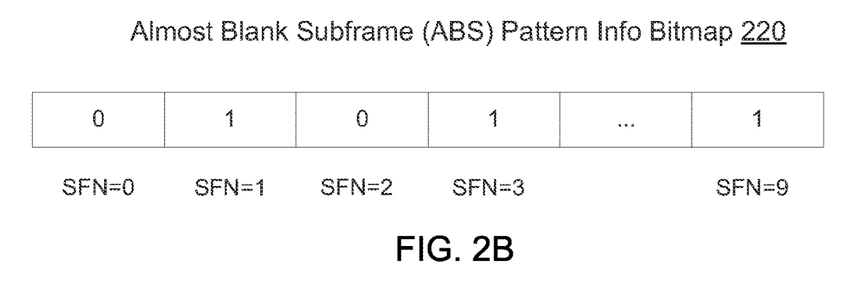

One method of solving this inter-cell interference problem is to use the so-called "Almost Blank Subframe" (ABS) at the interfering cell and inform the victim cell of this ABS configuration. The eNB of the victim cell then schedules its edge UEs during the subframes defined by the ABS of other interfering cell(s). FIG. 2A depicts an exemplary 10-ms radio frame 200, which is divided into ten 1-ms subframes. As shown in FIG. 2B, the data structure for storing the ABS configuration has the same number of bits as the number of subframes in a radio frame. In this example, a binary value "0" corresponds to the subframes that have an even index (SFN=0, 2, 4, 6, 8) and a binary value "1" corresponds to the subframe that have an odd index (SFN=1, 3, 5, 7, 9). In this example, the usable ABS Pattern Info 220 is defined as a bitmap, each position in the bitmap representing a corresponding downlink subframe. In particular, a binary value "1" corresponds to a subframe that has been designated as being protected from inter-cell interference from the aggressor cell, and is therefore available to be used by the victim cell for downlink scheduling. A binary value "0" is used for identifying other subframes that have been reserved by the aggressor cell for its own use.

In short, the ABS Pattern Info 220 identifies the subframes designated as almost blank subframes by the sending eNB (typically, of the aggressor cell) for the purpose of interference coordination. The receiving eNB (typically, of the victim cell) may consider such information when scheduling its own serving UEs. In some implementations, the aggressor cell also sends a request for feedback to the victim cell in order to know the victim cell's used ABS pattern and evaluate the need for modification of the ABS Pattern Info 220. The victim cell's pattern represented by the bitmap is a subset of, or the same as, the corresponding "ABS Pattern Info" message from the aggressor cell.

In this example, the aggressor cell periodically mutes the transmission that inflicts interference onto other victim cells for each designated subframe defined in the ABS Pattern Info message, so that the victim cells have a chance to serve their own UEs otherwise suffering the interference from the aggressor cell in these subframes. In some implementations, this muting is incomplete. Certain signals such as the common reference symbols, the primary and secondary synchronization signals (PSS and SSS), the physical broadcast channel (PBCH), and the system information block (SIB) and paging with their associated PDCCH, have to be transmitted even in the otherwise muted subframes, e.g., to avoid radio link failure or for reasons of backwards compatibility. Such muted subframes are thus referred to as almost blank subframes (ABS). In some implementations, the time domain muting (TDM) patterns are configured semi-statically and exchanged between different eNBs over the X2 interface.

As shown in FIG. 1B, the UEs in the vicinity of a victim cell are categorized into two groups:
  (i) UEs that are exposed to severe interference from another cell using TDM muting and hence should be scheduled in subframes muted by the corresponding aggressor cell (e.g., the edge UE 110 in FIG. 1B).
  (ii) UEs that are indifferent to the interference from another eNB using the TDM muting (e.g., the center UE 120 and the macro UE 195 in FIG. 1B).

Traditionally, there is no uni-cast point-to-point) data traffic from the eNB of an aggressor cell to a served UE during the ABSs of the aggressor cell. However, such restriction of not allowing uni-cast traffic during the subframes defined by the ABS Pattern Info from an aggressor cell has negative impacts on the overall system performance. On the other hand, there are many benefits for an aggressor cell to allow uni-cast traffic with lower than nominal power during the ABSs. For example, by allowing the transmission of uni-cast physical downlink shared channel (PDSCH) and the corresponding control channel reduced power information in the ABS, the aggressor cell has more flexibility in transmitting signals to some particular UEs. For example, in the macro-pico example shown in FIG. 1B, the macro UEs with good coverage (e.g., the macro UE 195) could be scheduled in the ABSs with reduced power transmission while still maintaining the interference to the pico eNB 100 below a predefined level. By doing so, the aggressor cell utilizes the resources that would otherwise be wasted for the sake of avoiding interference to pico cell(s). In this application, terms like "Reduced power ABS" or "low power ABS" are used interchangeably herein to refer to the subframe(s) which is designated by the aggressor cell as allowing tower than nominal transmit power or unicast PDSCH and associated physical downlink control channel (PDCCH).

The ABS pattern information in FIG. 2B makes it difficult for the victim cell to distinguish the ABS supporting reduced power unicast PDSCH/PDCCH from the ABS without any unicast traffic. This limitation affects the performance of edge UE in the victim cell because a particular edge UE within the victim cell may still observe strong interference from the aggressor cell in the reduced power ABS. The victim cell (i.e., the receiver of the ABS pattern information) cannot tell whether a particular ABS is a normal ABS without unicast traffic or a reduced power ABS. In turn, the victim cell eNB may schedule a particular edge UE in the reduced power ABS while believing that the ABS is a normal ABS To solve this problem, it is proposed in this application to exchange information on the reduced power ABS in addition to the conventional ABS pattern information between the aggressor and the victim cells such that the victim cell's eNB can schedule its serving UEs accordingly. As will be described below, such information can be conveyed between two cells in several ways.

Figure 3A:
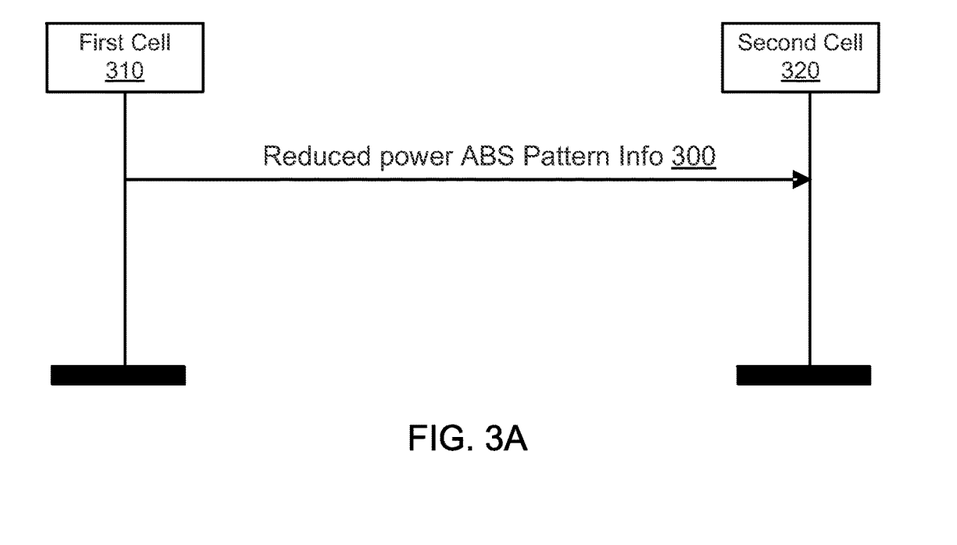
FIGS. 3A and 3B depict, respectively, a first exemplary implementation of conveying transmit power information from a first cell to a second cell and an associated data structure in accordance with some implementations.
Figure 3B:
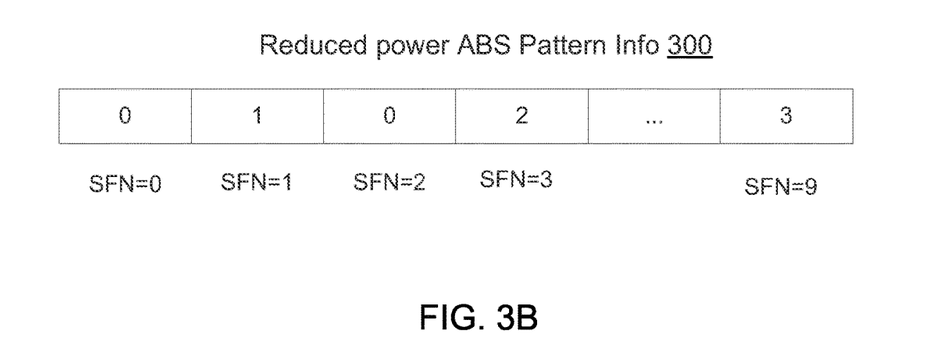

FIGS. 3A and 3B depict, respectively, a first implementation of conveying transmit power information from a first cell to a second cell and an associated data structure. In this implementation, the information of the reduced power ABS is conveyed by modifying the ABS Pattern Info 220 shown in FIG. 2B. Instead of using a binary bitmap to represent the ABS subframe information, a numerical string is used to represent the ABS and the reduced power ABS allocation from the aggressor cell to the victim cell. Each position in the string of the "reduced power ABS pattern info" 300 represents a downlink subframe, for which the value "1" indicates "ABS"; the value "0" indicates "non-ABS" and the value "2" indicates "reduced power ABS". The first position of the ABS pattern corresponds to subframe zero (SFN=0) within a radio frame where SFN=0. The ABS pattern is continuously repeated for all radio frames.

In some implementations, one reduced power ABS subframe could be reduced by at least 6 dB from the nominal transmit power while another reduced power ABS subframe could be reduced by at least 12 dB from the nominal transmit power. In this application, the term "minimum transmit power reduction level" stands for the minimum amount of transmit power reduction that an aggressor cell has promised or agreed relative to its nominal transmit power. A victim cell can leverage such information to determine if it can schedule a UE within a particular downlink subframe for a given minimum transmit power reduction level promised by the aggressor cell. This scheme gives more flexibility to both the aggressor cell and the victim cell in terms of scheduling their respective serving UEs. One way to support this scheme and convey the relative transmit power reduction level is to use different values in the "reduced power ABS pattern info" 300. For example, each position in the string of "reduced power ABS pattern info" 300 represents a downlink subframe, for which value "1" at SFN=1 indicates "ABS"; value "0" at SFN=0 and SFN=2 indicates "non ABS", value "2" at SFN=3 indicates "ABS with power reduced by 6 dB", value "3" at SFN=9 indicates "ABS with power reduced by 9 dB" and so on.

The table 1 below is an example of different values in the string and their corresponding transmit power reduction levels. FIG. 3A illustrate the message from the first cell 310 (typically the aggressor cell) to the second cell 320 (typically the victim cell) regarding the "reduced power ABS pattern info" 300.

TABLE 1

| Value | Unicast transmit power reduction level (dB) |
|---|---|
| 0 | 0 |
| 1 | ∞ |
| 2 | 6 |
| 3 | 9 |
| 4 | 12 |
| 5 | 15 |
| 6 | 18 |

Figure 4A:
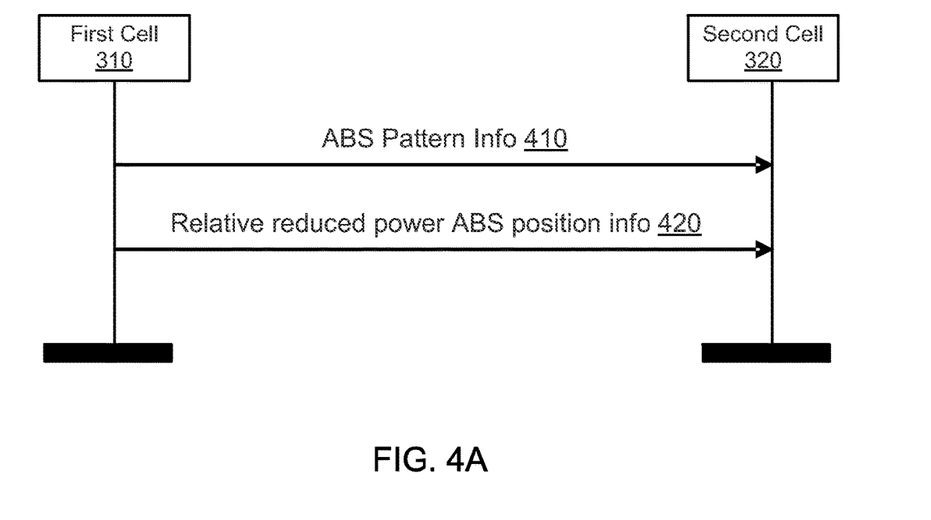
FIGS. 4A through 4C depict, respectively, a second exemplary implementation of conveying transmit power information from a first cell to a second cell and two associated data structures in accordance with some implementations.
Figures 4B, 4C:
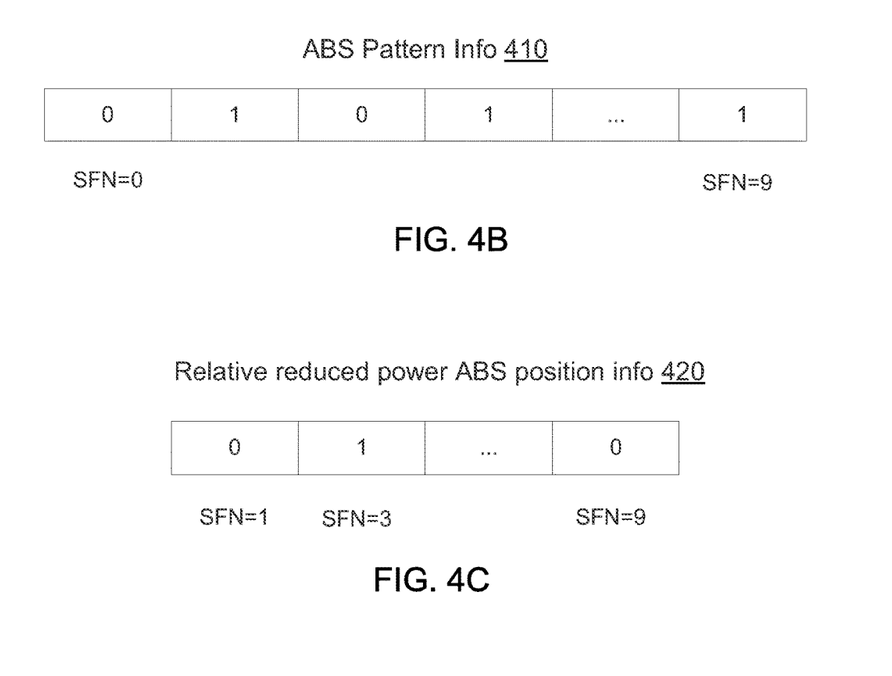

FIGS. 4A-4C depict, respectively, a second implementation of conveying transmit power information from a first cell to a second cell and two associated data structures. In this example, the information of reduced power ABS can be conveyed without modifying the conventional "ABS Pattern Info" 410. Instead, a new information entity (IE) defined as "relative reduced power ABS position info" 420 is used for supplementing the "ABS Pattern Info" 410.

In some implementations, a binary bitmap 410 shown in FIG. 4B represents the relative positions of reduced power ABSs in all the subframes designated as ABS by the aggressor cell. Each position in the bitmap represents a downlink subframe, for which the value "1" indicates "reduced power ABS" and the value "0" indicates "ABS". Note that the length of the bit string in the "relative reduced power ABS position info" 420 is the number of positions in the "ABS Pattern Info" bit string 300 whose value is "1". By combining "ABS Pattern Info" 410 and the "relative reduced power ABS position info" 420, the victim cell can obtain the information of subframes types (non-ABS, ABS, reduced power ABS) from the aggressor cell eNB.

In some implementations, a numerical string is used to indicate the different transmit power reduction levels in reduced power ABS. As shown in FIG. 4C, each position in the string of the "relative reduced power ABS position info" 420 represents a downlink subframe, for which the value "0" at SFN=1 and SFN=9 indicates "ABS" and the value "1" at SFN=3 indicates "ABS with power reduced by 6 dB", and so on. The table 2 is an example of different values in the string and their corresponding transmit power reduction levels in the "relative reduced power ABS position info" 420. FIG. 4A illustrates the messages from the first cell 310 (typically the aggressor cell) to the second cell 320 (typically the victim cell) regarding the "relative reduced power ABS position info" 420. In some implementations, the "ABS Pattern Info" 410 and the "relative reduced power ABS position info" 420 are contained into one message or kept in separated messages when transmitted between the two cells.

TABLE 2

| Value | Unicast transmit power reduction level (dB) |
|---|---|
| 0 | ∞ |
| 1 | 6 |
| 2 | 9 |
| 3 | 12 |
| 4 | 15 |
| 5 | 18 |

Figure 5A:
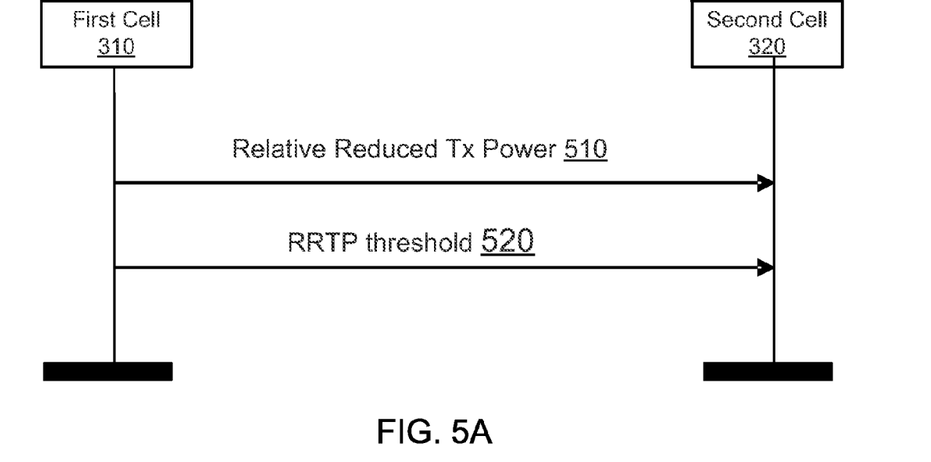
FIGS. 5A through 5C depict, respectively, a third exemplary implementation of conveying transmit power information from a first cell to a second cell and two associated data structures in accordance with some implementations.
Figure 5B:
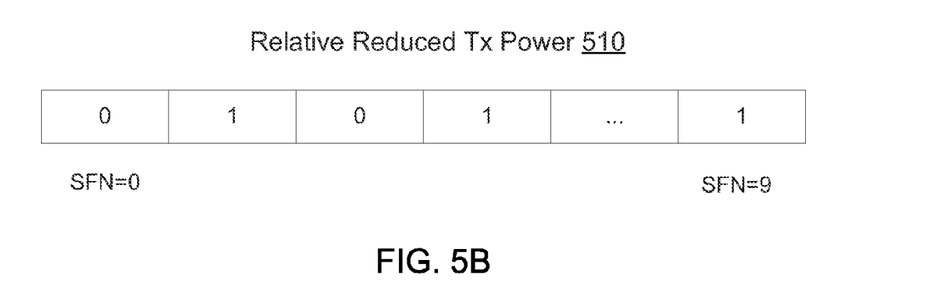
Figure 5C:
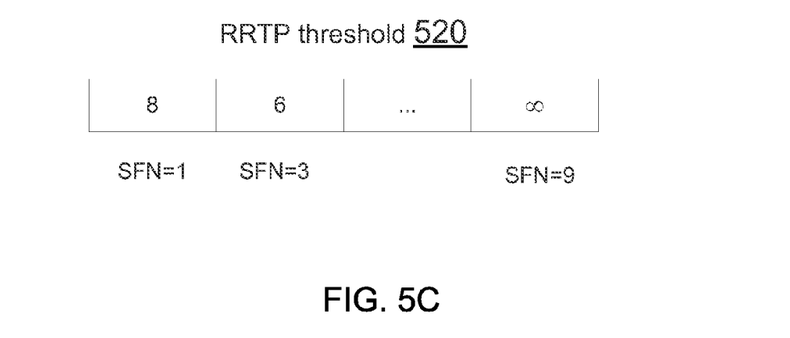

FIGS. 5A-5C depict, respectively, a third implementation of conveying transmit power information from a first cell to a second cell and two associated data structures. In this example, information of the reduced power ABSs can be conveyed by defining a new information entity "Relative Reduced Tx Power" 510 (RRTP), which is again bitmap. Each position in the bitmap represents a downlink subframe (i.e., first bit=subframe 0 and so on), for which the bit value RRTP(n) of "0" at SFN=0 indicates "no promise on the transmit power reduction is given" and the bit value RRTP(n) of "1" at SFN=9 indicates "Transmit power reduced exceeding RRTP threshold". In particular, $$RRTP(n) = \begin{cases} 1 \text{ if } \frac{P_{max}}{P_{out}(n)} \geq RRTP_{threshold} \\ 0 \text{ if no promise about the lower limit of } \frac{P_{max}}{P_{out}(n)} \text{ is made} \end{cases}$$

where:
  $P_{out}(n)$ is the intended base station output power in the considered subframe;
  n is the subframe index;
  $RRTH_{threshold}$ may be one of the values $RRTP_{threshold} \in \{6, 7,8,9,10,11,12,13,14,15,16,17,18,\infty\}$ [dB]; and
  $P_{max}$ is the base station maximum output transmit power.

A combination of the "RRTP threshold" 520 and the "Relative Reduced Tx Power" 510 provides an indication on the power restriction of each downlink subframe in a cell and other information needed by a neighbor cell for performing the interference coordination. Note that the length of the bit string of the "Relative Reduced Tx Power (RRTP)" 510 could be the same as that of the "ABS Pattern Info" 220 in FIG. 2B. FIG. 5A illustrates the messages from the first cell 310 (typically the aggressor cell) to the second cell 320 (typically the victim cell) using the "Relative Reduced Tx Power" 510. Note that the "Relative Reduced Tx Power" 510 and the "RRTP threshold" 520 could be contained into one message or kept in separated messages.

Figure 6:
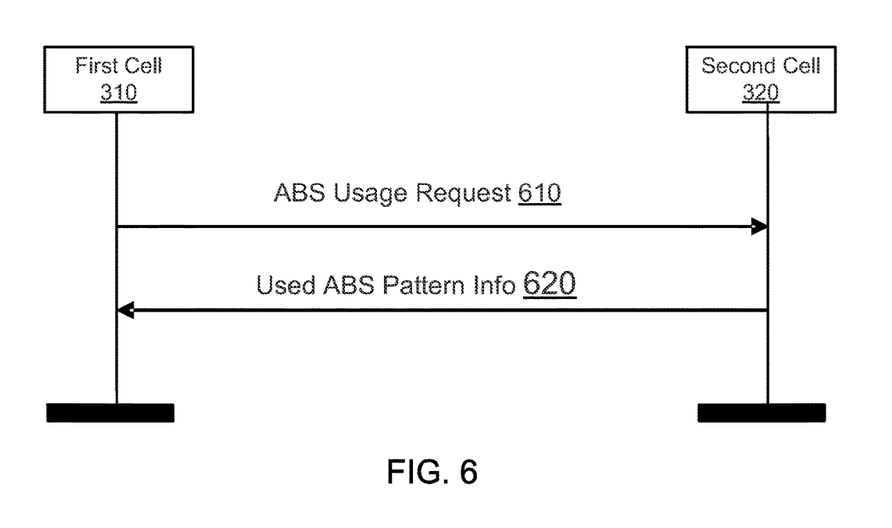
FIG. 6 depicts an exemplary implementation of conveying used ABS pattern information from a second cell to a first cell in response to a request from the first cell.

In some implementations, an aggressor cell may request feedback from a victim cell about the ABS pattern information that is used by the victim cell. This feedback indicates the ABS subframes actually used in the victim cell. The resource status reporting is defined as in 3GPP IS 36.423: "Evolved Universal Terrestrial Radio Access Network (E-UTRAN); X2 application protocol (X2AP)," which is incorporated by reference in its entirety. FIG. 6 depicts that the aggressor cell (the first cell 310) sends an ABS usage request 610 to the victim cell (the second cell 320) for its used ABS pattern information and the victim cell then replies to the aggressor cell by providing its used ABS pattern information 620.

In the current 3GPP specification, a "downlink ABS status" information entity, which represents the percentage of the used ABS resources, is specified in the feedback from the victim cell to the aggressor cell. The numerator of the percentage represents the number of resource blocks within the ABS indicated in the Usable ABS Pattern Info IE, which have been allocated (i.e., actually used) by the victim cell. The denominator of the percentage represents the total number of resource blocks within the ABS indicated in the Usable ABS Pattern Info IE. However, such scheme cannot provide information about accurate ABS resource utilization by the victim cell if both ABS and reduced power ABS are contained in the usable ABS Pattern Info IE. For example, the aggressor cell (the receiver of the downlink ABS status) cannot tell whether the ABS status feedback is for a normal ABS without no unicast traffic or a reduced power ABS. In turn, the aggressor cell eNB cannot adjust the normal ABS and the reduced power ABS patterns accurately. Thus, a "reduced power (RP) ABS status" IE is also proposed, which represents the percentage of used resources in the reduced power ABS.

Figure 7:
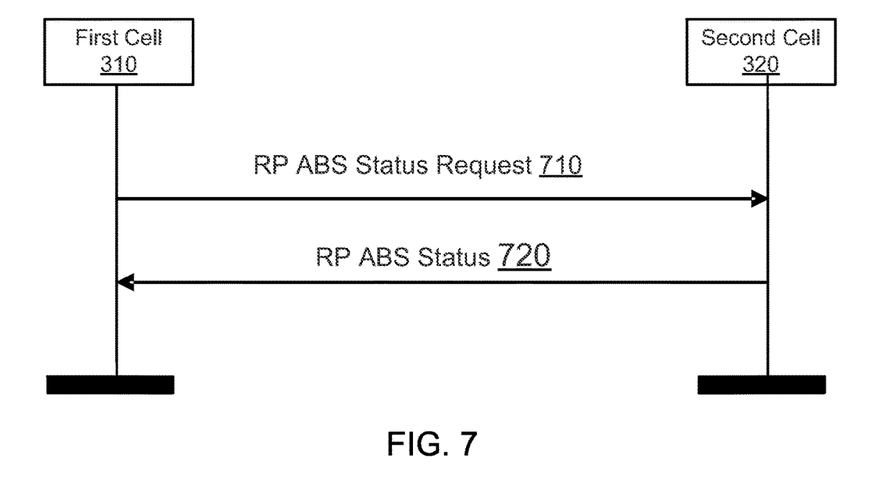
FIG. 7 depicts an exemplary implementation of conveying used reduced power ABS status information from a second cell to a first cell in response to a request from the first cell.

FIG. 7 depicts that the aggressor cell (first cell 310) sends an RP ABS status request 710 to the victim cell (second cell 320) for the used reduced power ABS status information and the victim cell then replies to the aggressor cell by providing an RP ABS status 720. The numerator of the percentage represents the number of resource blocks allocated by the victim cell within the usable reduced power ABS and the denominator of the percentage is the total number of resource blocks within the usable reduced power ABS in the victim cell.

White particular implementations are described above, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria, and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

I claim:

1. A method performed by a first cell of conveying transmit power information from the first cell to a second cell, comprising:
    preparing a data structure at the first cell, wherein the data structure includes a plurality of elements, each element corresponding to a respective downlink subframe in a radio frame associated with the first cell;
    assigning a numerical value to each element, the numerical value corresponding to a respective minimum transmit power reduction level promised by the first cell during the respective downlink subframe corresponding to the element; and
    transmitting the data structure from the first cell to the second cell via a predefined backhaul connection interface, wherein the data structure includes:
        a first numerical value for a respective downlink subframe of the radio frame that is reserved by the first cell for its own use,
        a second numerical value for a respective downlink subframe of the radio frame that is designated as being used for other cells including the second cell by the first cell, and
        a third numerical value for a respective downlink subframe of the radio frame that is promised as having at least a non-zero, non-infinity, minimum transmit power reduction level from a nominal transmit power level from the first cell,
    wherein the second cell is configured to share, with the first cell, a downlink subframe of the radio frame corresponding to the third numerical value by scheduling a user equipment in the downlink subframe of the radio frame in accordance with its minimum transmit power reduction level promised by the first cell.

2. The method of claim 1, wherein the data structure is a string including a plurality of numerical values, a relative position of a respective numerical value in the string corresponding to a relative position of the respective downlink subframe in the radio frame.

3. A method performed by a first cell of conveying transmit power information from the first cell to a second cell, comprising:
    preparing a data structure at the first cell, wherein the data structure includes a plurality of elements, each element corresponding to a respective downlink subframe in a radio frame associated with the first cell;
    assigning a numerical value to each element, the numerical value corresponding to a respective minimum transmit power reduction level promised by the first cell during the respective downlink subframe corresponding to the element; and
    transmitting the data structure from the first cell to the second cell via a predefined backhaul connection interface, wherein the data structure is a string including a plurality of numerical values, a relative position of a respective numerical value in the string corresponding to a relative position of the respective downlink subframe in the radio frame,
    wherein the respective numerical value has a value selected from the group consisting of 0, 1, 2, 3, 4, 5, and 6, which represents the first cell's minimum transmit power reduction levels at 0 dB, $\infty$ dB, 6 dB, 9 dB, 12 dB, 15 dB, and 18 dB, respectively, from a nominal transmit power level,
    wherein the second cell is configured to share, with the first cell, a downlink subframe of the radio frame corresponding to a value selected from the group consisting of 2, 3, 4, 5, and 6 by scheduling a user equipment in the downlink subframe of the radio frame in accordance with its corresponding minimum transmit power reduction level promised by the first cell.

4. The method of claim 3, wherein the minimum transmit power reduction level of 0 dB means that the first cell transmits at its nominal transmit power level and the second cell may not schedule any user equipment in a corresponding downlink subframe.

5. The method of claim 3, wherein the minimum transmit power reduction level of $\infty$ dB means that the first cell will not schedule any user equipment in a corresponding downlink subframe.

6. The method of claim 3, wherein the minimum transmit power reduction level of one selected from the group consisting of 6 dB, 9 dB, 12 dB, 15 dB, and 18 dB means that the first cell will schedule any user equipment in a corresponding downlink subframe below a corresponding transmit power level, which is reduced at least an amount defined by the minimum transmit power reduction level from a nominal transmit power level.

7. The method of claim 1, wherein the first cell is an aggressor cell and the second cell is a victim cell.

8. The method of claim 1, wherein the first cell is configured to transmit the data structure to the second cell using one message.

9. The method of claim 1, wherein the first cell is a macro eNB and the second cell is one selected from the group consisting of a remote radio head, a pico eNB, and a femto eNB.

10. The method of claim 1, wherein the predefined backhaul connection interface is an X2 interface defined by 3GPP.

11. The method of claim 2, wherein the respective numerical value has a value selected from the group consisting of 0, 1, 2, 3, 4, 5, and 6, which represents the first cell's minimum transmit power reduction levels at 0 dB, $\infty$ dB, 6 dB, 9 dB, 12 dB, 15 dB, and 18 dB, respectively, from a nominal transmit power level.

12. The method of claim 11, wherein the minimum transmit power reduction level of 0 dB means that the first cell transmits at its nominal transmit power level and the second cell may not schedule any user equipment in a corresponding downlink subframe.

13. The method of claim 11, wherein the minimum transmit power reduction level of co dB means that the first cell will not schedule any user equipment in a corresponding downlink subframe.

14. The method of claim 11, wherein the minimum transmit power reduction level of one selected from the group consisting of 6 dB, 9 dB, 12 dB, 15 dB, and 18 dB means that the first cell will schedule any user equipment in a corresponding downlink subframe below a corresponding transmit power level, which is reduced at least an amount defined by the minimum transmit power reduction level from a nominal transmit power level.

* * * * *